United States Patent [19]

Cartoceti

[11] 4,455,117

[45] Jun. 19, 1984

[54] APPARATUS FOR THE EMPTYING OF CIGARETTE TRAYS INTO MAGAZINES

[75] Inventor: Italiano Cartoceti, Bologna, Italy

[73] Assignee: Cir S.p.A. Divisione Sasib, Bologna, Italy

[21] Appl. No.: 446,199

[22] Filed: Dec. 2, 1982

Related U.S. Application Data

[62] Division of Ser. No. 171,424, Jul. 23, 1980, Pat. No. 4,403,908.

[30] Foreign Application Priority Data

Jul. 31, 1979 [IT]  Italy ................................ 12699 A/79

[51] Int. Cl.³ .............................................. B65G 65/32
[52] U.S. Cl. .................................... 414/295; 414/303;
414/414; 414/420; 414/421
[58] Field of Search ............... 414/403, 404, 411, 414,
414/419, 421, 295, 303, 420

[56] References Cited

U.S. PATENT DOCUMENTS

| | | | |
|---|---|---|---|
| 2,753,062 | 7/1956 | Loudon | 414/414 |
| 3,283,930 | 11/1966 | Cascio et al. | 414/403 X |
| 3,332,560 | 7/1967 | Niepmann | 414/403 X |
| 3,460,687 | 8/1969 | Bardenhagen | 414/295 |
| 3,486,647 | 12/1969 | Seragnoli | 414/414 |
| 3,883,017 | 5/1975 | Shirai et al. | 414/414 |
| 3,989,199 | 11/1976 | Seragnoli | 414/414 |

*Primary Examiner*—Robert G. Sheridan
*Attorney, Agent, or Firm*—Spencer & Frank

[57] ABSTRACT

The feed hopper of a cigarette packing machine is provided with an inlet mouth comprising a fixed rectangular tubular member over which there is mounted telescopically slidable in the vertical direction a telescoping rectangular tubular member. The tray filled with cigarettes is positioned upside down, with its discharge side closed by a bottom closure plate, over the open upper end of the telescoping tubular member. The full tray is then lowered, together with the telescoping member, until the bottom closure plate reaches the level of the cigarettes already contained in the hopper. At this point, a level sensing device gives a control signal for the side shifting, and consequent opening, of the discharge side of the tray. After the opening of the discharge side, the tray is again raised to its starting position.

4 Claims, 6 Drawing Figures

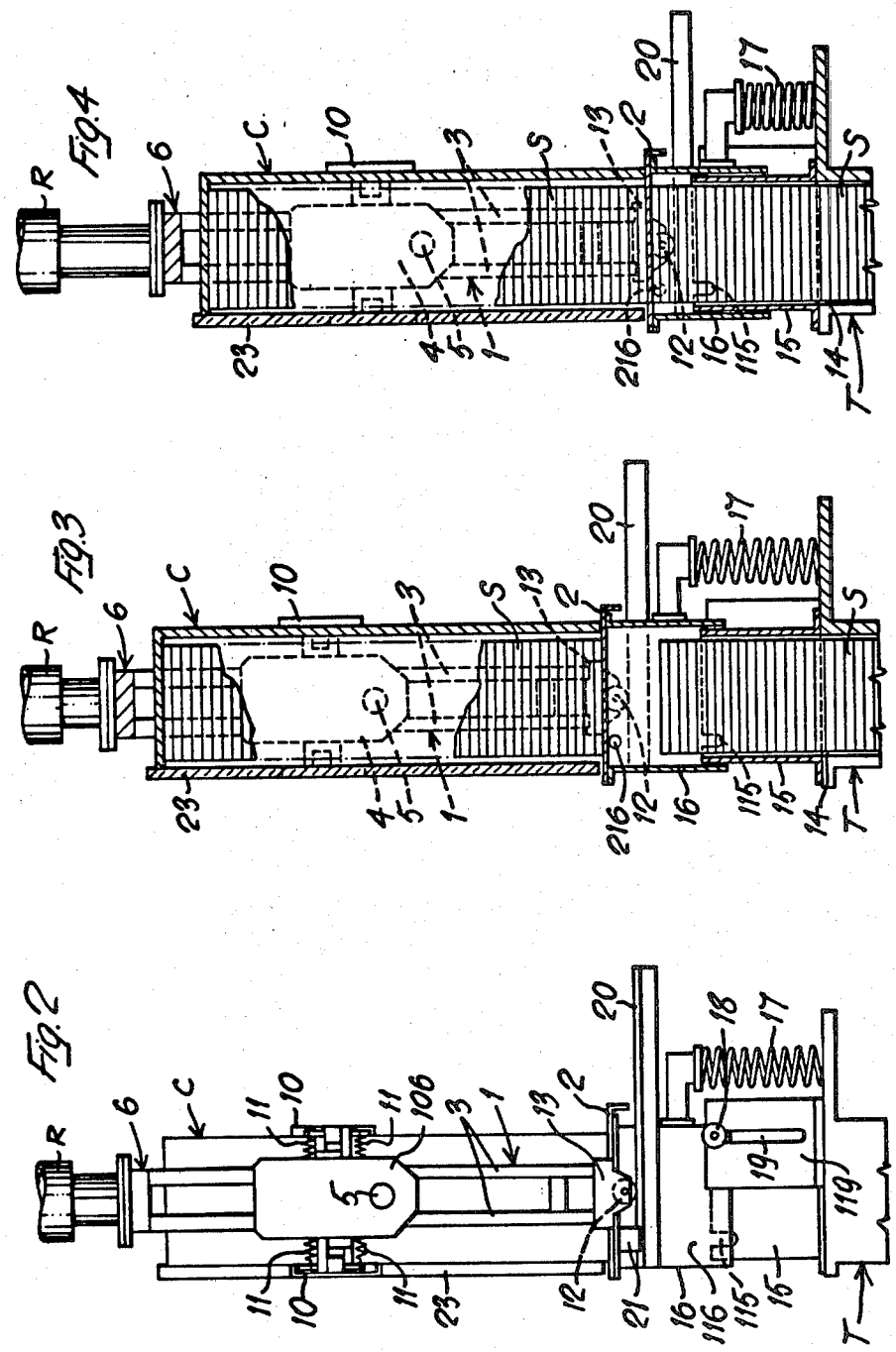

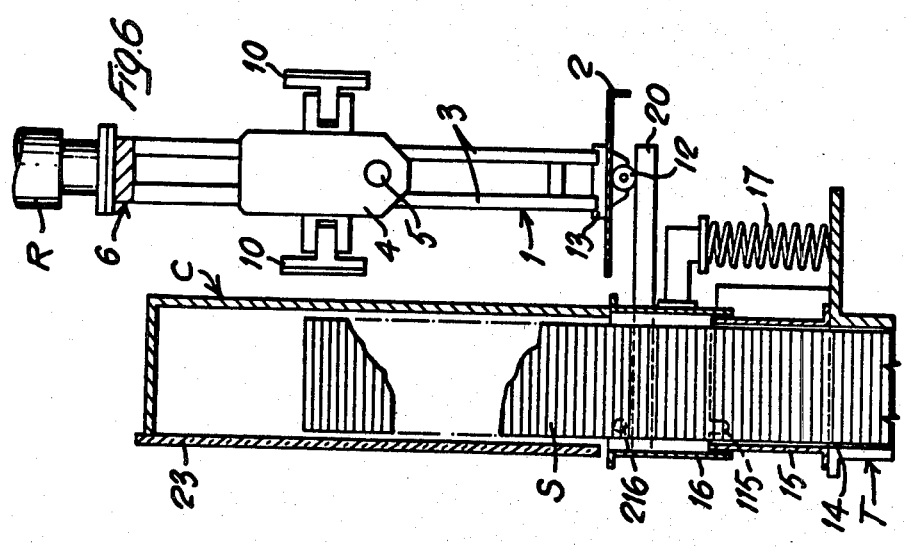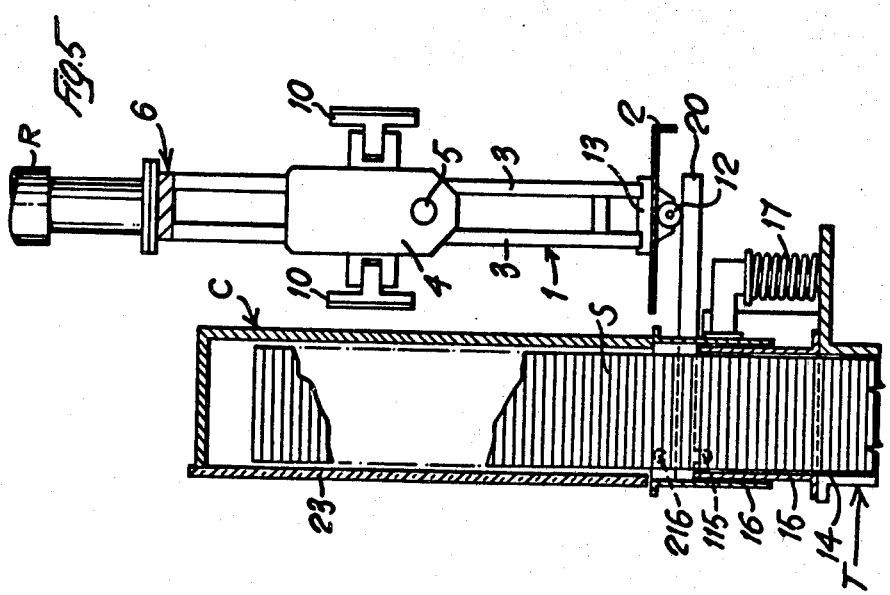

APPARATUS FOR THE EMPTYING OF CIGARETTE TRAYS INTO MAGAZINES

This is a division of application Ser. No. 171,424 filed July 23, 1980, now U.S. Pat. No. 4,403,908.

BACKGROUND OF THE INVENTION

The present invention relates to the feeding of rod-like articles, such as cigarettes, to magazines or hoppers from which the articles are fed to a manipulating machine, such as a cigarette packing machine. The said feeding is usually performed by emptying into the hopper the so-called trays, which are in the form of containers having the shape of parallelepipeds open at two adjacent sides, inside which the articles are arranged side-by-side in superposed rows.

There are known devices in which the full tray is introduced into a holder frame which closes its open sides and then is turned upside down onto the hopper. The cigarettes are then discharged from the tray into the hopper by opening the discharge side of the tray. Level sensing means are provided which sense the level of the cigarettes in correspondence with the inlet mouth of the hopper, and generate a control signal for the substitution of the emptied tray with a new full tray.

Between the moment in which the said control signal for the substitution of the emptied tray is given, and the moment in which the discharge side of the newly-placed full tray is opened, there passes a certain period of time, during which the level of the articles in the hopper continues to decrease, due to the uninterrupted operation of the cigarette packing machine which receives the articles from the hopper.

As a consequence, when the discharge side of the full tray is opened, the discharged cigarettes effect a free drop, the length of which depends on the speed of the packing machine and on the period of time required for the substitution of the trays. This free drop of the cigarettes into the hopper should be avoided, since it can be detrimental to the orderly arrangement of the cigarettes in the hopper itself, and consequently to the operation of the cigarette packing machine.

In order to avoid this inconvenience, there have been studied devices which greatly reduce the periods of time required for the substitution of an empty tray with a full tray, and for the actual starting of the discharge of the cigarettes from the newly placed full tray into the hopper. The problem however remains, as a consequence of the present utilization of the so-called high speed packing machines, whereby, even if the tray substitution time is very short, the level of cigarettes in the hopper during said time decreases in a considerable manner, and the actual length of the free drop of the cigarettes at the opening of the discharge side of the full tray is remarkable.

SUMMARY OF THE INVENTION

According to the invention, there is provided a method for the emptying of trays filled with rod-like articles, such as cigarettes, into magazines or hoppers from which the articles are fed to a manipulating machine, such as a cigarette packing machine, each tray presenting at least one open side or discharge side for the discharge of the articles, characterized by the following steps:

(a) positioning a full tray, with the discharge side closed and directed downwardly, over the hopper;
(b) lowering the said full tray down until the closed discharge side reaches the level of the articles already contained in the hopper;
(c) opening the said discharge side of the full tray;
(d) raising again the tray up to its initial position.

In this manner, the discharge of the cigarettes from the full tray into the hopper takes place without any free drop, since the discharge side of the full tray is brought down to the level of the cigarettes in the hopper and then it is opened, practically putting in contact without interruption the uppermost layer of cigarettes in the hopper with the lowermost layer of cigarettes in the tray.

According to the invention, there is also provided an apparatus for carrying out the above mentioned method, which is characterized by the fact that the feed hopper of the cigarette packing machine presents an inlet mouth comprising a tubular member over which there is slidably mounted a telescoping tubular member vertically movable from a raised starting position to a lowered discharge position. The upper open end of the telescoping tubular member serves as a support for the tray, and is temporarily connected with the discharge side of the tray. The discharge side of the tray is closed by a thin closure plate which can be removed by sidewise shifting, so as to permit the discharge of the cigarettes contained in the tray. Level sensing means are provided for controlling the sidewise movement of the said closure plate which will take place only when the discharge side of the tray has been lowered, thanks to the telescopic construction to the inlet mouth of the hopper, to the level of the cigarettes already contained in the hopper.

The above and other features of the invention, and the advantages deriving therefrom, will appear evident from the following detailed description of a preferred embodiment, made with reference to the attached drawings.

BRIEF DESCRIPTION OF THE DRAWINGS

FIG. 2 is a side elevation view of the apparatus shown in FIG. 1.

FIGS. 3 to 6 are views in transverse section of the apparatus according to FIG. 1, representing as many operative phases of same.

DESCRIPTION OF THE PREFERRED EMBODIMENT

Figure 1:
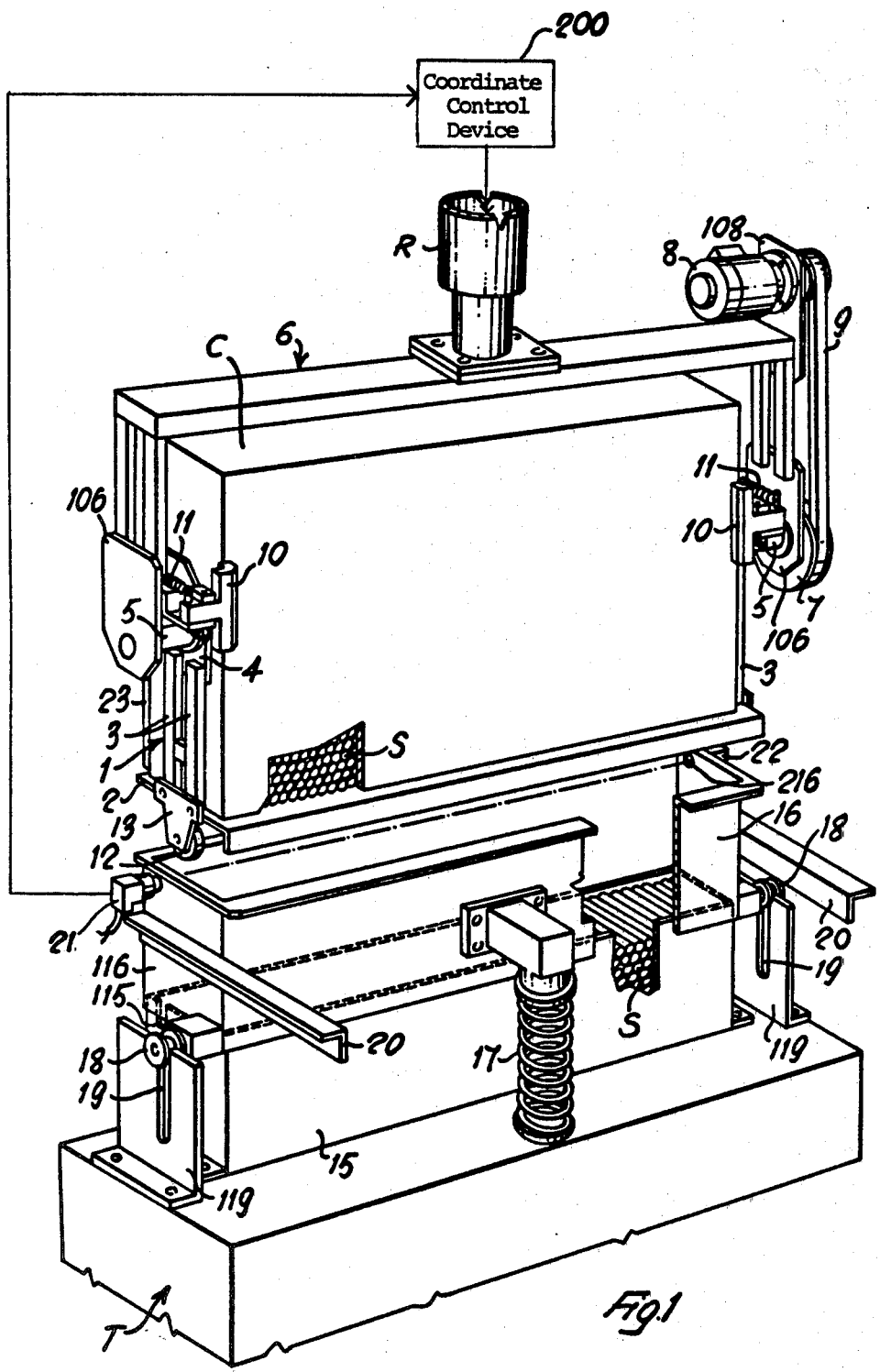
FIG. 1 is a perspective view, with parts broken away, of the apparatus for carrying out the method according to the invention.

With reference to the Figures, a batch of cigarettes S, stacked side-by-side within tray C, must be transferred without interruption, or difference in level, into the hopper T of a cigarette packing machine which is operating at high speed.

The tray C is constructed, as usual, in the form of a rectangular parallelepiped container, presenting two adjacent open sides, of which one is a large side and the other is the adjacent longitudinal side, which is also the "discharge side" of the cigarettes during the emptying operation.

The tray C is arranged in a tray holding frame 1 comprising a bottom plate 2 which prevents the discharge of the cigarettes contained in the tray when the latter is in the upside down position, as indicated in the drawings. The bottom plate 2 is provided, at its transverse ends, with a pair of upright members 3, which are perpendicular to the said plate 2.

Each pair of upright members 3 is secured at the top to a vertical supporting plate 4 which presents a pin 5. The two pins 5 are located symmetrically, on both sides of the tray C, so as to be aligned with each other and extend outwardly with respect to the sides of the tray C. To the said pins 5 there are hinged the plate-like extremities 106 of the arms of a U-shaped stirrup 6, which is centrally secured to the driving arm R of a coordinate control device 200, which can be of any known type.

The said coordinate control device 200 is capable of promoting translational movements of the tray holding frame 1 along three orthogonal Cartesian coordinate axes, according to a programmed sequence.

In addition to the said translational movements, the tray frame 1 can perform half-turn rotations around pins 5. For this purpose, on the extension of one of said pins 5 there is keyed a pulley 7, which is driven by electric motor 8, through the belt transmission 9. Motor 8 is mounted on a bracket 108 secured to one of the legs of the stirrup 6.

Tray C is blocked into stirrup 6 by means of a pair of grippers 10, hinged to supporting members secured to the side plates 4. The grippers 10 are normally kept open by the springs 11, and are closed upon control, under the action of pneumatic cylinders (not shown).

At the lower extremity of each pair of upright members 3 there is secured a support member 13, which projects downwardly and which carries a freely rotatable thrust roller 12, for purposes which will be explained hereinafter.

On the inlet mouth of the hopper T there is applied a telescopic assembly consisting of two box-like tubular structures 15, 16, open at their ends, the structure 15 being secured in correspondence of the inlet mouth of the hopper T, while the structure 16 is mounted telescopically slidable at the exterior of the said first mentioned structure 15, and can be moved downwardly against the action of spring 17.

In order to ensure the proper telescopic movement, each side wall 116 of the structure 16 carries a rotatable grooved roller 18, which engages the vertical guide slot 19 of an angle plate 119 secured in correspondence of the inlet mouth of the hopper T.

To each side wall 116 of the telescoping structure 16 there is secured an angle bar 20 which presents a flat horizontal surface cooperating, as a guiding element, with the thrust roller 12 of the tray holder frame 1.

In the opposed head walls 116 of the telescoping structure 16 there are obtained two bores 216, aligned to each other. A suitable light emitting source 22 of a level sensing device of the photoelectric type is mounted in correspondence of one bore 216, while a photo sensitive element 21 is mounted in correspondence of the opposite bore 216.

The operation of the above described apparatus is the following:

In a preliminary phase of the operation, the holder frame 1 takes from a storage station a full tray C with the plate 2 acting as top covering lid for the open discharge side of the tray C. The tray C is blocked inside the frame 1 by means of the grippers 10, and the full tray C is then turned through an angle of 180°, so that when the tray has been turned upside down, the discharge of the cigarettes S is not permitted by the plate 2 which has reached its bottom or closure position.

In the meantime, another tray C is being emptied by discharging the cigarettes through the inlet mouth of the hopper. When the said tray has been completely emptied, a control signal is emitted by the level sensing device 21-22, the empty tray is moved away in a known manner, and the coordinate control device 200 moves the full tray C so as to precisely align same with the telescoping box-like tubular structure 16.

At this point, the tray holder frame 1 is progressively lowered. When the thrust rollers 12 touch the guide angle bars 20, the bottom plate 2 becomes tangent to the top of the telescoping box-like structure 16 (see FIG. 3). By further continuing the lowering of frame 1, the rollers 12 promote the consequent lowering of telescoping structure 16 (FIG. 4).

Preferably, the vertical transparent plate 23 (which closes the larger open side of the tray C) is lowered together with the telescoping structure 16.

The lowering of the telescoping structure 16 is stopped when the light beams emitted by the light source 22 (normally received by photocell 21) are intercepted by the objects (cigarettes S) at the interior of the structure 16.

At this point, the grippers 10 are opened (FIG. 5) and the tray holder frame 1 is moved away sidewise horizontally, so as to cause the sliding of the bottom plate 2 away from the bottom of the tray C. In this manner, the cigarettes S contained in the tray C are allowed to be discharged into the hopper, by effecting a free drop which is equal to the thickness of the bottom plate 2, and therefore is practically irrelevant. During the sidewise horizontal displacement of the frame 1, the rollers 12 remain in operative contact with the angle bars 20, thus keeping the telescoping structure 16 in its lowered position. Subsequently, the coordinate control device 200 promotes the raising of the frame 1 with consequent raising, thanks to the action of spring 17, of the telescoping structure 16 (FIG. 6).

The tray holder frame 1 then removes the empty tray, turns it again to its original upright position and deposits it at an empty tray station. Subsequently, the frame 1 takes another full tray, turns it upside down and brings it into waiting position for another loading operation.

It can be noted that the lower box-like tubular structure 15 presents, in correspondence of its opposed small sides, a pair of vertical slots 115, vertically aligned with the level sensing device 21, 22. The scope of these slots 115 is precisely that required to permit the passage of the light beam of the level sensing device down to a further extent, and consequently to permit a more ample downward movement of the telescoping box 16. In fact, the descent of the level of cigarettes inside the hopper T depends upon the speed of the packing machine, so that the actual movement of the telescoping structure 16 is determined eventually by the speed of the cigarette packing machine.

It is believed that the invention will have been clearly understood from the foregoing detailed description of one preferred embodiment. Changes in the details of construction may be resorted to without departing from the spirit of the invention, and it is accordingly intended that no limitation be implied and that the hereto annexed claims be given the broadest interpretation to which the employed language fairly admits.

I claim:

1. Apparatus for the emptying of trays filled with rod-like articles wherein each of said trays has at least one discharge side for the discharge of said articles, comprising
- a feed hopper having an inlet mouth for receiving said rod-like articles;
- a telescoping member interposed between said tray and said feed hopper, said telescoping member supporting said tray and having an upper open end connected with the discharge side thereof, the lower end of said telescoping member being slideably mounted with respect to the upper end of said feed hopper;
- means for moving said telescoping member in the vertical direction from a raised starting position to a lower discharge position at which the uppermost layer of rod-like articles in said feed hopper are at substantially the same vertical level as the lowermost layer of rod-like articles in said tray; and
- transferring means for transferring said rod-like articles from the discharge side of said tray to the inlet mouth of said feed hopper, the uppermost layer of rod-like articles in said feed hopper being substantially in contact with the lowermost layer of rod-like articles in said tray, the articles in said tray being transferred to said feed hopper without subjecting said articles to a free drop between said tray and said feed hopper.

2. Apparatus as defined in claim 1 wherein said transferring means includes a thin flat closure plate; and control means for closing the discharge side of said tray with said closure plate, said closure plate being located, when said tray is full and positioned over said hopper, at the level of the upper open end of said telescoping member, said control means further shifting said closure plate horizontally to open the discharge side of said full tray.

3. Apparatus as defined by claim 2 which further comprises a level sensing device positioned at a predetermined level and coupled to said control means, said level sensing means sensing the presence of said articles in said feed hopper at said predetermined level when said telescoping member has been lowered to said lower discharge position and controlling said control means to shift said closure plate horizontally to open the discharge opening of said tray, said level sensing device further raising said telescoping member from said lower discharge position to said starting position.

4. Apparatus as defined in claim 3 wherein said level sensing device comprises a light emitting source and a photocell positioned on opposite sides of said telescoping member, said light emitting source emitting a light beam which traverses said telescoping member in the horizontal direction for reception by said photocell, said light beam, upon lowering of said telescoping member, being interrupted by the pressure of the articles previously located in said feed hopper.

* * * * *